Patented Oct. 1, 1940

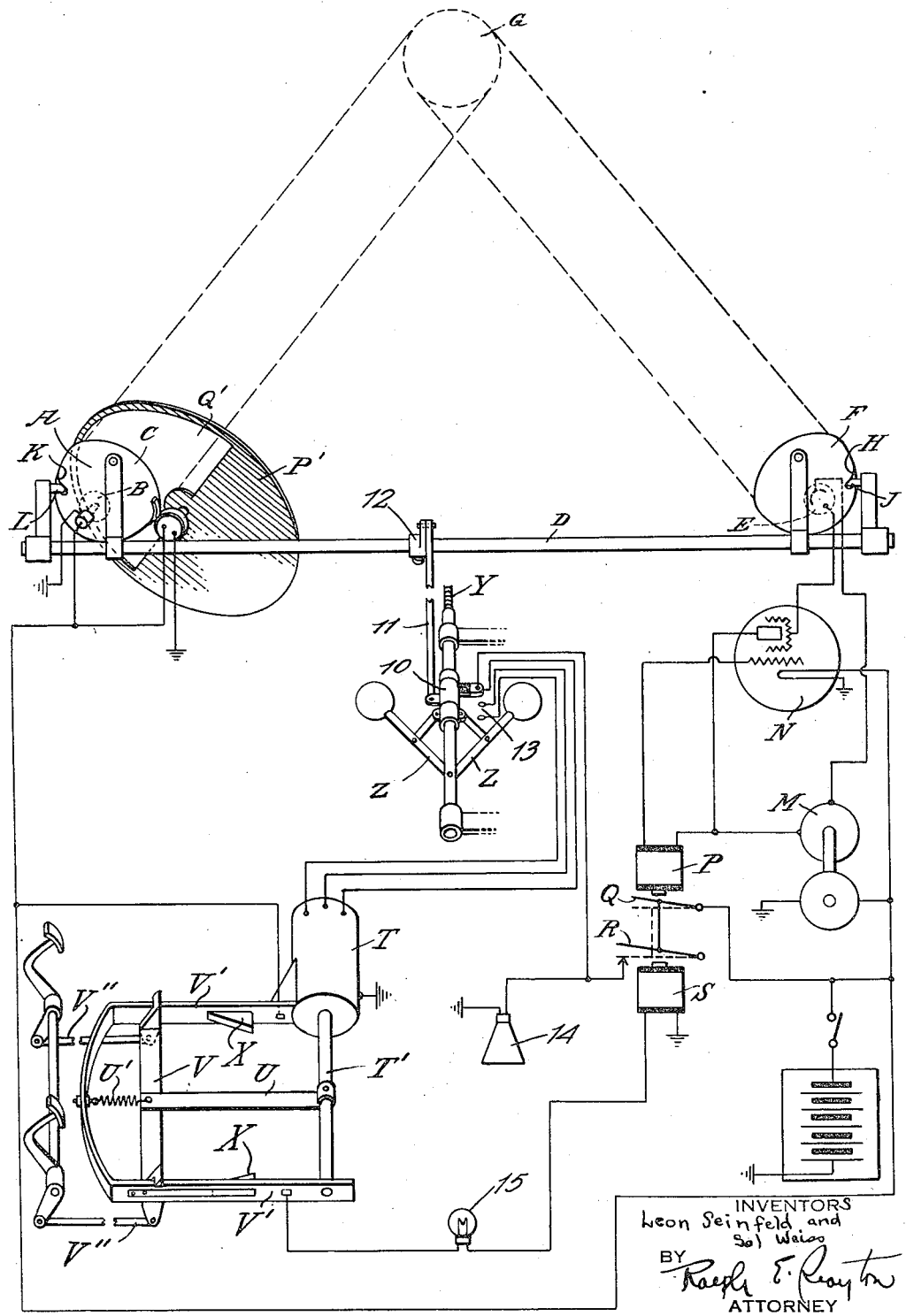

2,216,575

UNITED STATES PATENT OFFICE 2,216,575

VEHICLE SAFETY DEVICE

Leon Seinfeld and Sol Weiss, Brooklyn, N. Y., assignors of one-third to Mathias Naphtali, Brooklyn, N. Y., one-third to Florence Eisen, Brooklyn, N. Y., and one-third to said Sol Weiss Application January 19, 1938, Serial No. 185,733

8 Claims. (Cl. 180—82)

This invention relates to devices for changing the direction and speed of a vehicle when an extraneous object appears within a predetermined distance thereof.

Comprehensively stated, the invention comprises means for creating a periodic electromagnetic disturbance, with a unit responsive to the electro-magnetic disturbance and means including the unit acting to alter the speed or direction of the vehicle or both.

More specifically stated, the invention comprises a light beam illuminating a light sensitive cell from a point outside of the vehicle, the light sensitive cell being included in a circuit comprising mechanism acting to arrest the motion of the vehicle or change its direction when the beam of light acting on the cell is altered. The beam of light, particularly when the invention is used on a vehicle operating in a lighted urban area, is periodically interrupted resulting in a similarly interrupted reflected beam affording a pulsating current through the light sensitive (photoelectric) cell circuit, the pulsations, however, being rapid enough to create in effect a substantially direct current to continually energize an auxiliary device, for instance an electro magnet, in turn controlling an auxiliary circuit, acting to arrest the motion of the vehicle or change its direction when the light beam is interrupted for a substantial period. The invention also comprises means for changing the angular inclination of the beam so as to direct it to a more distant point as the speed of the vehicle is increased.

The object of the invention is to provide mechanism which will operate to change the speed or direction of the vehicle when an object appears within a predetermined distance of the vehicle. Another object is to vary this distance in accordance with the speed of the vehicle.

In the drawing accompanying this specification, one embodiment of the invention is illustrated. It is to be understood, however, that this embodiment merely serves as an illustration of the underlying principles of the invention so that they may be readily comprehended by those skilled in the art and is not intended as limiting the invention to the specific form disclosed therein.

In the drawing a diagrammatic plan view of the invention is shown with some of the parts in perspective.

Continuing now by way of a more detailed description, a light source A, of any convenient type, for instance a conventional electric light bulb B is mounted in a preferably parabolic reflector C, mounted for instance on one end of a rotatable rod D so that the light source and its reflector may be tilted to vary the distance of the reflecting light area to be described from the vehicle. A photoelectric cell E is similarly mounted in a parabolic reflector F, and preferably on the other end of the transverse rotatable rod D. The downwardly directed beam of light emanating from the bulb B illuminates a spot in the roadway G, generally in front of the vehicle, although due to the irregularity of the roadbed, the light is reflected at various angles, some of the reflected light entering the parabolic reflector and illuminating the photoelectric cell E. This photoelectric cell controls the mechanism for arresting the vehicle as will be more fully described hereinafter. The interposition of a light arresting body, either between the light source B or the light reflected from the area G varies the resistance of the photoelectric cell circuit as is well understood. In order that the safety zone around the vehicle may be varied it is desirable that the beam of light be tilted so as to throw it further away from the vehicle as the speed of the vehicle increases, in order to take care of the increased braking distance required. The mechanism for tilting the light and the photoelectric cell comprises a governor driven at a speed proportional to the speed of the vehicle and which will be more fully described hereinafter. In order that the light rays be reflected from the light reflecting area G into the parabolic reflector F, the parabolic reflector is turned about a vertical axis as well as a horizontal axis so as to follow the illuminated area G. This is effected for instance by a cam slot H co-acting with a pin J so that as the axis of the parabolic reflector is tilted to approach a horizontal plane the reflector is rotated about a vertical axis in a clockwise direction as will be readily understood. The reflector C of the light bulb B may be similarly controlled by a cam slot K and a pin L engaging the slot K. The photoelectric cell is included in a circuit comprising a generator M, an amplifier N of the vacuum type and an electro magnet P. In order that the photoelectric cell may not be affected by extraneous light, for instance the street lights in populated centers, the light source B is periodically interrupted for instance by a rotating disc P' having an opening Q', the disc being rotated rapidly enough so as to create a substantially continuous pulsating beam, which permits the circuit controlled by the photoelectric cell to be tuned to the period of the pulsating beam. So long as the photoelectric cell E is illuminated the electro magnet P is energized. When the illumination of the photoelectric cell is interrupted for a period substantially exceeding the normal rate of interruption causing the pulsation of the beam, the electro-magnet P is deenergized and the release of its armature Q causes armature R under the influence of its electro-magnet S to close a circuit including motor T. The motor rotates a shaft T' and winds up a belt U against the tension of spring U' to pull a cross arm V sliding on oppositely disposed guides V' and connected to the vehicle brake mechanism by any suitable mechanism, for instance links V" to locking position with the oppositely disposed keeper members X. A suitable latching arrangement is provided on the cross arm V to lock with the keepers X as will be readily understood. As the speed of the vehicle varies, a shaft Y connected to any suitable part of the running gear, preferably the transmission or tail shaft, rotates the governor arms Z connected by a sliding collar 10 longitudinally movable along the shaft Y. A link connection 11 rotates the shaft D through crank arm 12 and thereby changes the angular inclination of the reflectors A and F as will be readily understood.

The speed of motor T is also controlled through the variable resistance afforded by the three point contacts 13, cooperating with the sliding collar 10 of the governor.

The device operates as follows:

The light beam periodically illuminates spot G in the roadway some of the light being reflected to periodically illuminate the photoelectric cell E. The periodic pulsations are close enough to produce in effect a continuous current to normally energize electro magnet P, holding armatures Q and R up. When the illumination of the photoelectric cell is cut off, the armature R drops down and closes the circuit to motor T through one of the three point contacts 13 and applies the brakes by the rotation of the motor T at a speed partly proportioned to the speed of the vehicle since the governor is driven by the running gear.

The circuit including the electro magnet P can be tuned to the frequency of the pulsating light beam by balancing its inductance with variable capacity if necessary.

Various auxiliary devices may be included in a circuit as for instance a horn 14 and light 15.

When an electric or magnetic disturbance is mentioned in the description or claims it is intended to include visible as well as invisible portions of the spectrum as well as the hertzian waves and cosmic rays.

It is claimed:

1. A vehicle control device comprising means for creating a wave disturbance of constant frequency, a unit to receive the reflected waves and tuned to be responsive to its disturbance frequency, said wave disturbance creating means and said reflected wave receiving unit being tiltably arranged on the vehicle in permanent reflective focus, means responsive to the speed of the vehicle for simultaneously tilting the said wave disturbance creating means and the said reflected wave receiving unit, and means actuated by the unit to alter the movement of the vehicle when the disturbance frequency is interrupted.

2. A device for the external control of a vehicle comprising means for creating a wave disturbance of constant frequency, including a directed light beam and means for interrupting the same at a uniform frequency, a unit, including a light sensitive element to receive reflected light from the directed light beam and tuned to be responsive to its disturbance frequency, the light beam source and the light sensitive member being tiltably arranged on the vehicle in permanent reflective focus, means responsive to the speed of the vehicle for simultaneously tilting the said light beam source and the said light sensitive member and means actuated by the unit to alter the movement of the vehicle when the disturbance frequency is interrupted.

3. A device for the external control of a vehicle comprising means for creating a wave disturbance of constant frequency, a unit to receive the reflected waves and tuned to be responsive to its disturbance frequency, the wave creating source and the unit being tiltably arranged on the vehicle in permanent reflective focus, and means responsive to the speed of the vehicle for adjusting the position of the wave creating means and the reflected wave receiving unit on the vehicle whereby to vary the distance of the reflecting focus from the vehicle.

4. A vehicle control device comprising means for creating a wave disturbance of constant frequency, a unit to receive the reflected waves and tuned to be responsive to its disturbance frequency, said wave disturbance creating means and said reflected wave receiving unit being tiltably arranged on the vehicle in permanent reflective focus, and means actuated by the unit to alter the movement of the vehicle when the disturbance frequency is interrupted, and means responsive to the speed of the vehicle for tilting the said wave disturbance creating means and the said reflected wave receiving unit whereby to vary the distance of the reflecting focus from the vehicle.

5. A vehicle control device comprising means for creating a wave disturbance of uniform frequency, including a directed light beam and means for interrupting the same at a uniform frequency, a unit including a light sensitive element arranged to receive reflected light from the directed light beam and tuned to be responsive to its disturbance frequency, the said light source and the said light sensitive element being tiltably arranged on the vehicle, means for simultaneously and uniformly tilting the said wave creating means and the said light sensitive element and means for maintaining the said wave creating means and the said light sensitive element in permanent reflecting focus.

6. A vehicle control device, including a rotatable shaft, a wave source mounted on the shaft, a wave responsive unit mounted on the shaft, said wave source and said wave responsive unit being tiltably arranged on the shaft in reflective focus with one another and means responsive to the speed of the vehicle to adjust the position of the wave source and the wave responsive unit whereby to vary the distance of the reflecting focus from the vehicle.

7. A vehicle control device comprising a wave creating source tiltably mounted on the vehicle, a wave responsive unit tiltably mounted on the vehicle, and means responsive to the speed of the vehicle for simultaneously and uniformly tilting the said wave creating source and the said wave responsive unit and means for maintaining the said wave creating source and the said wave responsive unit in permanent reflective focus.

8. A vehicle control device comprising means for creating a wave disturbance of constant frequency arranged on the vehicle to direct the wave diagonally across the entire line of travel of the vehicle, a unit arranged on the vehicle to receive the reflected wave and tuned to be responsive only to its disturbance frequency, and means actuated by the said unit to alter the movement of the vehicle when the disturbance frequency is interrupted.

LEON SEINFELD.
SOL WEISS.